(12) United States Patent
Park et al.

(10) Patent No.: US 9,067,476 B2
(45) Date of Patent: Jun. 30, 2015

(54) TEMPERATURE CONTROL APPARATUS FOR VEHICLE

(75) Inventors: Heesang Park, Gyeonggi-do (KR); Junmo Ku, Gyeonggi-do (KR); Junekyu Park, Gyeonggi-do (KR); Junghwan Yun, Seoul (KR); Hyun Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 810 days.

(21) Appl. No.: 13/090,824

(22) Filed: Apr. 20, 2011

(65) Prior Publication Data

US 2012/0132392 A1 May 31, 2012

(30) Foreign Application Priority Data

Nov. 30, 2010 (KR) .................. 10-2010-0120650

(51) Int. Cl.
*B60H 1/00* (2006.01)
*F25B 13/00* (2006.01)

(52) U.S. Cl.
CPC ........ *B60H 1/00907* (2013.01); *B60H 1/00385* (2013.01); *B60H 2001/00928* (2013.01); *B60H 2001/00949* (2013.01); *F25B 13/00* (2013.01); *F25B 2400/24* (2013.01)

(58) Field of Classification Search
CPC ........... B60H 1/00385; B60H 1/00907; B60H 2001/00928; B60H 2001/00949; F25B 2400/24
USPC ....................... 165/202, 203, 204, 241, 61, 64
See application file for complete search history.

(56) References Cited

U.S. PATENT DOCUMENTS

| | | | | |
|---|---|---|---|---|
| 5,299,631 A | * | 4/1994 | Dauvergne | 165/204 |
| 6,464,027 B1 | * | 10/2002 | Dage et al. | 165/202 |
| 7,069,983 B2 | * | 7/2006 | Yakumaru et al. | 165/202 |
| 7,287,581 B2 | * | 10/2007 | Ziehr et al. | 165/202 |
| 7,451,808 B2 | * | 11/2008 | Busse et al. | 165/202 |
| 8,612,092 B2 | * | 12/2013 | Okamoto et al. | 165/202 |

(Continued)

FOREIGN PATENT DOCUMENTS

| | | |
|---|---|---|
| CN | 1147401 C | 4/2004 |
| CN | 101279580 A | 10/2008 |

(Continued)

OTHER PUBLICATIONS

Chinese Office Action for Application No. 201110120024.7, mailed Mar. 2, 2015, 18n pages.

*Primary Examiner* — Ljiljana Ciric
(74) *Attorney, Agent, or Firm* — Mintz Levin Cohn Ferris Glovsky and Popeo, P.C.; Peter F. Corless

(57) ABSTRACT

A temperature control apparatus for a vehicle is provided that includes an electric device that is cooled by circulating cooling fluid. A heater core is disposed adjacent to an interior heat exchanger of a heat pump to receive the cooling fluid that has cooled the electric device. In addition, the apparatus includes a first valve that controls the supply of the cooling fluid from the electric device to the heater core. Accordingly, using the temperature control apparatus, air-conditioning performance of vehicles, is improved using heat generated from electric devices, together with a heat pump, when the vehicles, such as hybrid or electric vehicles, are equipped with electric devices, such as a motor, an inverter, and a converter and the electric devices are air-conditioned using the heat pump.

6 Claims, 5 Drawing Sheets

(56) References Cited

U.S. PATENT DOCUMENTS

| | | | |
|---|---|---|---|
| 8,631,659 B2 * | 1/2014 | Goenka | 62/244 |
| 8,753,762 B2 * | 6/2014 | Major et al. | 165/202 |
| 8,839,894 B2 * | 9/2014 | Yokoyama et al. | 180/68.4 |
| 8,863,542 B2 * | 10/2014 | Damsohn et al. | 62/259.2 |
| 8,863,543 B2 * | 10/2014 | Heckenberger et al. | 62/259.2 |
| 2005/0061497 A1 | 3/2005 | Amaral et al. | |
| 2005/0133215 A1 * | 6/2005 | Ziehr et al. | 165/202 |
| 2005/0241818 A1 * | 11/2005 | Yakumaru et al. | 165/202 |
| 2005/0247446 A1 | 11/2005 | Gawthrop | |
| 2006/0060340 A1 * | 3/2006 | Busse et al. | 165/202 |
| 2006/0123823 A1 | 6/2006 | Ha et al. | |
| 2011/0120146 A1 * | 5/2011 | Ota et al. | 165/64 |
| 2012/0073797 A1 * | 3/2012 | Park et al. | 165/64 |
| 2012/0118988 A1 * | 5/2012 | Lee et al. | 165/202 |
| 2012/0122000 A1 * | 5/2012 | Lee et al. | 165/202 |
| 2012/0312520 A1 * | 12/2012 | Hoke et al. | 165/203 |
| 2013/0213631 A1 * | 8/2013 | Ichishi et al. | 165/202 |

FOREIGN PATENT DOCUMENTS

| | | |
|---|---|---|
| CN | 101551175 A | 10/2009 |
| CN | 101844501 A | 9/2010 |
| JP | 6171346 A | 6/1994 |
| JP | 6293210 A | 10/1994 |
| JP | 11157326 A | 6/1999 |
| JP | 2002090009 A | 3/2002 |
| JP | 2006-051852 A | 2/2006 |
| JP | 2006321389 A | 11/2006 |
| JP | 2009-280020 A | 12/2009 |
| KR | 10-0388825 | 6/2003 |
| KR | 10-2006-0068173 A | 6/2006 |
| KR | 10-2009-0056370 | 6/2009 |

\* cited by examiner

TEMPERATURE CONTROL APPARATUS FOR VEHICLE

CROSS-REFERENCE TO RELATED APPLICATIONS

The present application claims priority to Korean Patent Application Number 10-2010-0120650 filed Nov. 30, 2010, the entire contents of which application is incorporated herein for all purposes by this reference.

BACKGROUND OF THE INVENTION

1. Field of the Invention

The present invention relates to a temperature control apparatus for a vehicle, and more particularly, to a technology of improving air-conditioning efficiency of hybrid vehicles and electric vehicles which implement air-conditioning, using a heat pump.

2. Description of Related Art

A heat pump, as shown in FIG. 1, is designed to air-condition an interior, e.g., of a vehicle, using an interior heat exchanger 500 at the interior and an exterior heat exchanger 502 at the outside, which are switched to function independently as a evaporator and a condenser in accordance with switching the flow direction of a coolant compressed by compressor 504 through a 4-way valve 506.

FIG. 1 shows an interior heating mode, illustratively when the exterior condition is that air with moisture below zero is around exterior heat exchanger 502. In this instance, exterior heat exchanger 502 may become covered with frost and the frost reduces performance of exterior heat exchanger 502, such that the interior heating performance is reduced.

Therefore, it is necessary to operate the heat pump in a defrost mode in order to remove the frost, which requires switching the heating mode to the defrost mode, such that it is difficult to appropriately control the interior temperature of a vehicle.

Hybrid vehicles or electric vehicles are equipped with electric devices, such as a motor, an inverter, and a converter. Typically, a specific cooling system is provided in hybrid vehicles to remove heat generated while the electric devices are in operation, and in the related art, the heat from the electric devices is discharged outside simply through the cooling system.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

The present invention has been made in an effort to provide a temperature control apparatus for a vehicle that improves air-conditioning efficiency of vehicles, using heat generated from electric devices, together with a heat pump, when the vehicles are equipped with the electric devices, such as a motor, an inverter, and a converter, such as hybrid vehicles or electric vehicles.

An exemplary embodiment of the present invention provides a temperature control apparatus for a vehicle, including an electric device that is cooled by circulating cooling water; a heater core that is disposed adjacent to an interior heat exchanger of a heat pump to receive the cooling water that has cooled the electric device; and a first valve that controls supply of the cooling water from the electric device to the heater core.

According to the exemplary embodiments of the present invention, it is possible to improve air-conditioning performance of vehicles, using heat generated from electric devices, together with a heat pump.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
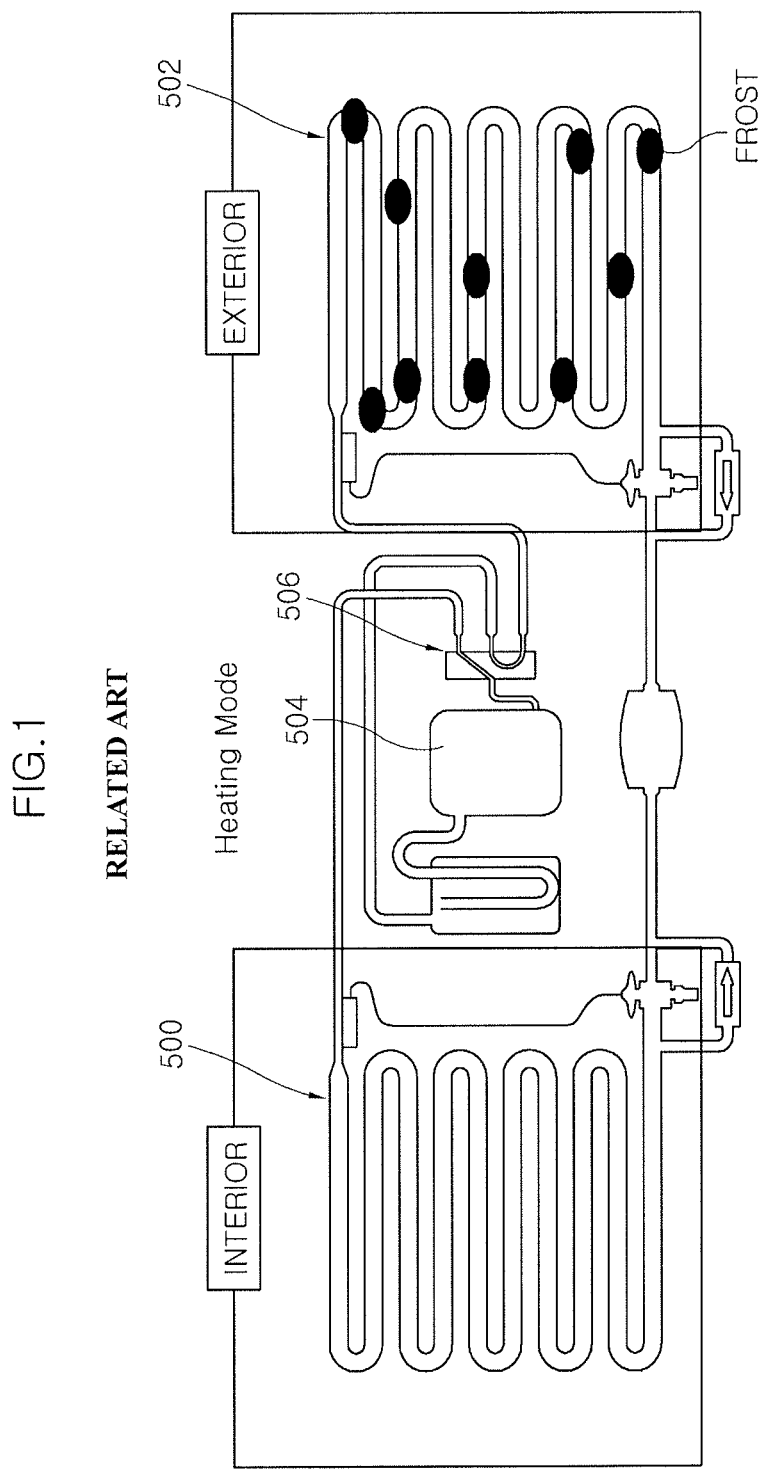
FIG. 1 is a view illustrating a heat pump of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Figure 2:
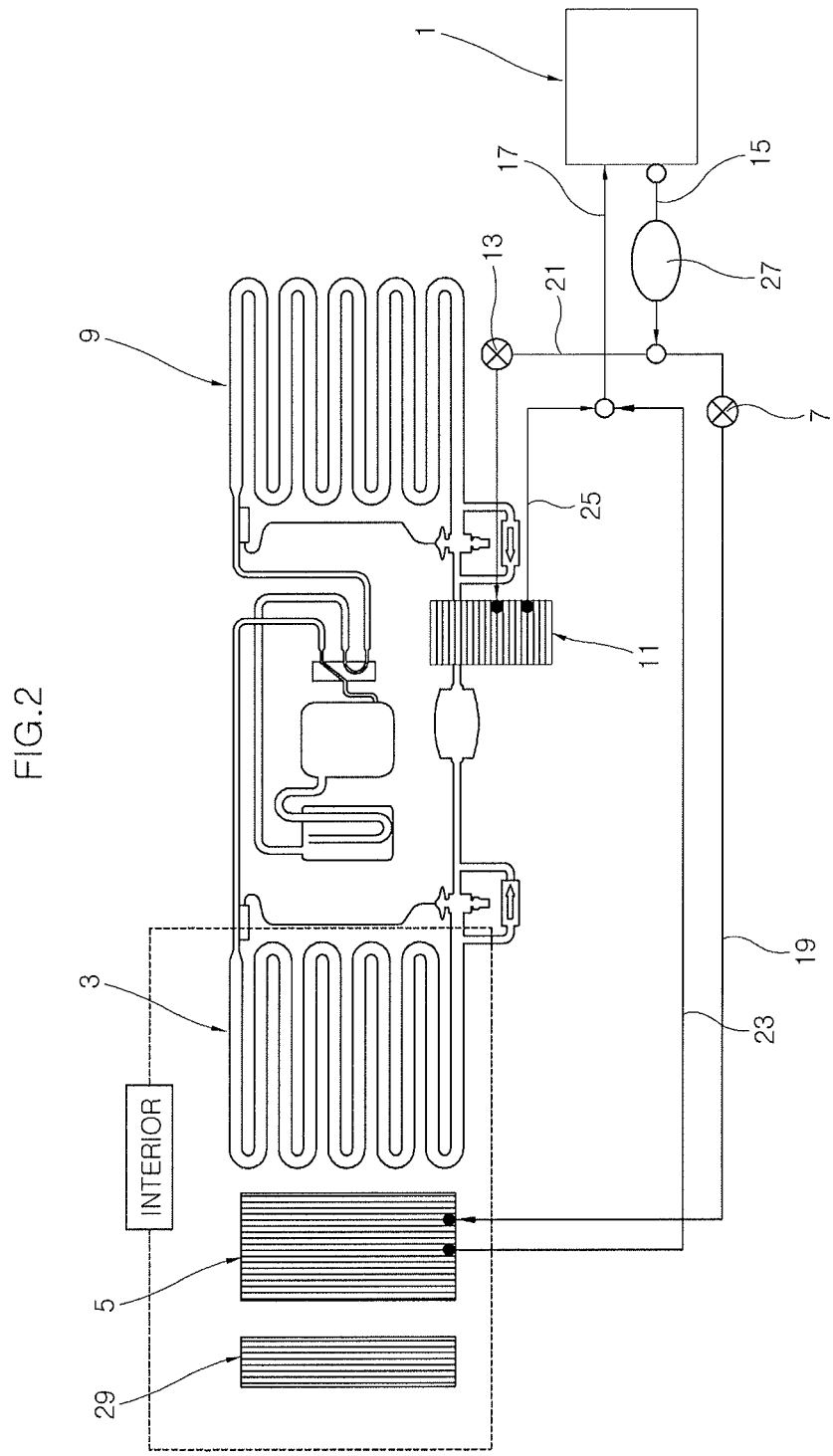
FIG. 2 is a view exemplifying the configuration of a temperature control apparatus for a vehicle according to an exemplary embodiment of the present invention.

Referring to FIG. 2, a temperature control device for a vehicle according to an exemplary embodiment of the present invention includes an electric device 1 that is cooled by cooling fluid (e.g., water) circulating, a heater core 5 receiving the cooling water that has cooled electric device 1 and disposed adjacent to an interior heat exchanger 3 of a heat pump, and a first valve 7 controlling supply of the cooling water from electric device 1 to heater core 5.

Further, a heat pump warmer 11 as a heat exchanger allowing the cooling water from electric device 1 to circulate and exchanges heat, is further disposed in a coolant pipe for supplying a coolant (e.g., refrigerant) to an exterior heat exchanger 9 of the heat pump and a second valve 13 is further provided to control supply of the cooling water from electric device 1 to heat pump warmer 11.

That is, this configuration is designed to remove frost from exterior heat exchanger 9 of the heat pump, in addition to heating the interior, by using heat from electric device 1, which may be a motor, an inverter, or a converter, such as those that are used in driving electric vehicles or hybrid vehicles.

A common supply line 15 for discharging the cooling water and a common collecting line 17 for collecting the cooling water are connected to electric device 1, in which common supply line 15 is divided into a first supply line 19 connected to heater core 5 and a second supply line 21 connected to heat pump warmer 11, and common collecting line 17 is divided into a first collecting line 23 connected to heater core 5 and a second collecting line 25 connected to heat pump warmer 11.

In this configuration, a cooling water pump 27 is disposed in common supply line 15 to supply the cooling water from electric device 1 to heater core 5 and heat pump warmer 11, first valve 7 is disposed in first supply line 19, and second valve 13 is disposed in second supply line 21.

Therefore, when cooling water pump 27 is operated and first valve 7 is opened, the cooling water heated by electric device 1 is supplied to heater core 5 through first supply line 19, and in which when second valve 13 is opened, the cooling water is supplied to heat pump warmer 11 through second supply line 21.

Heater core 5 is disposed in a channel through which air is sent to the interior while exchanging heat with interior heat exchanger 3 of heat pump and makes it possible to provide appropriate performance of heating the interior by additionally heating the air heated through interior heat exchanger 3 of the heat pump or independently heating the air that is sent to the interior while the heat pump operates in a heating mode.

Further, in the exemplary embodiment, it is possible to heat the interior by activating a positive temperature coefficient (PTC) heater 29 even on an initial cold start of a vehicle in which heating with the heat pump and heating with heater core 5 are difficult, by further disposing the PTC heater 29 on the channel through which air is sent to the interior while exchanging heat with interior heat exchanger 3 of heat pump.

Figure 3:
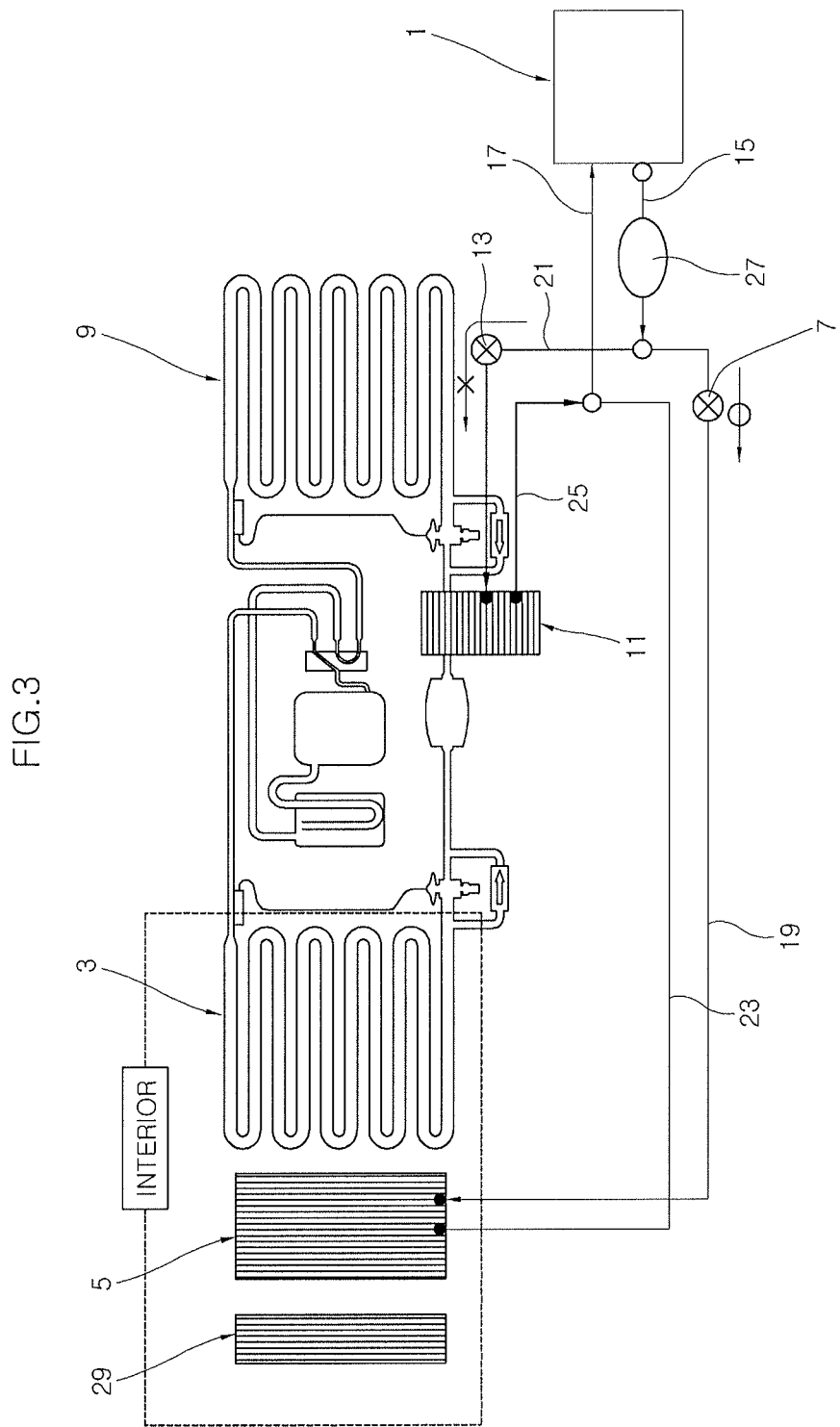
FIGS. 3 to 5 are views illustrating the operation of the present invention.
Figure 4:
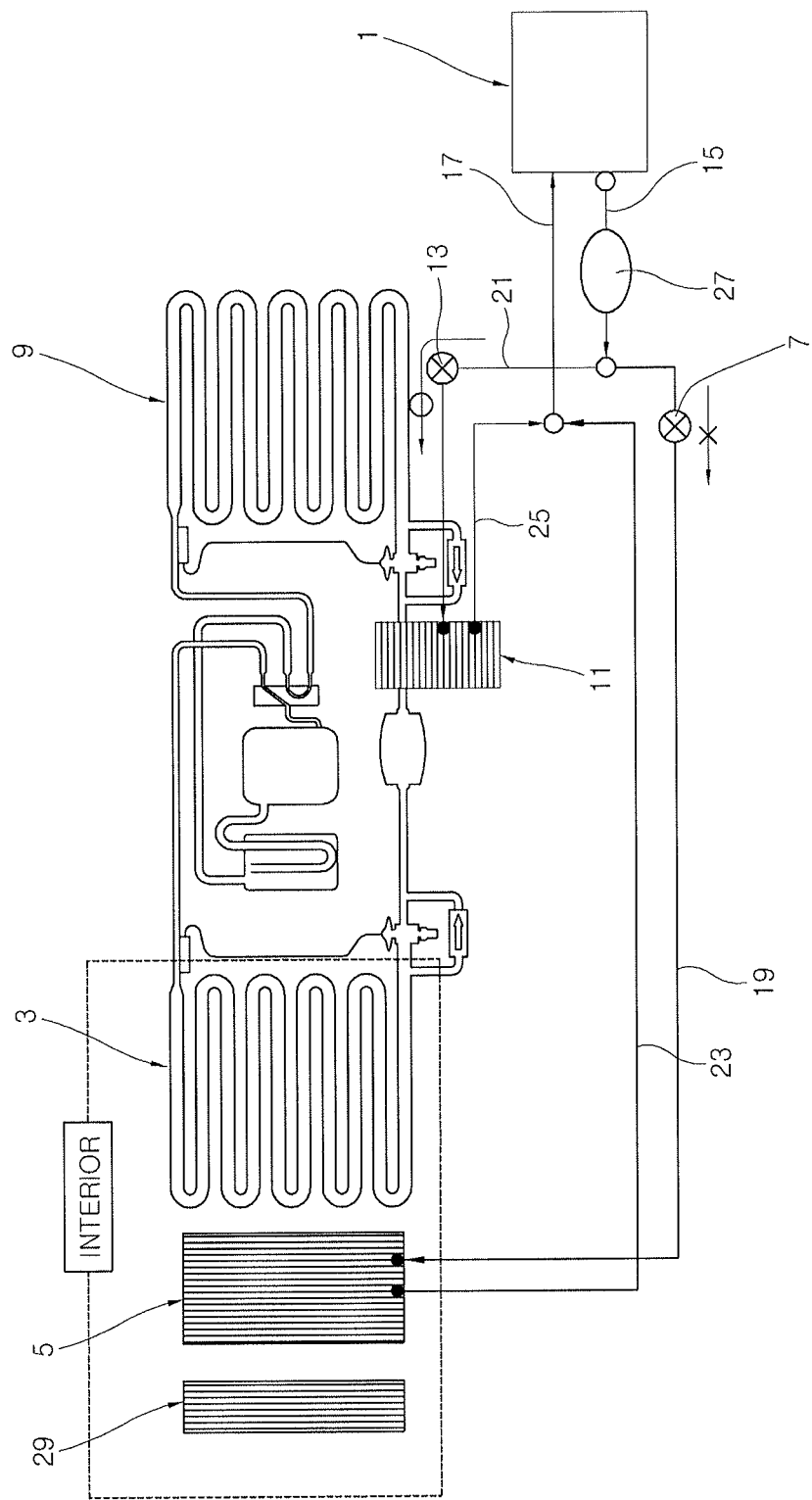
Figure 5:
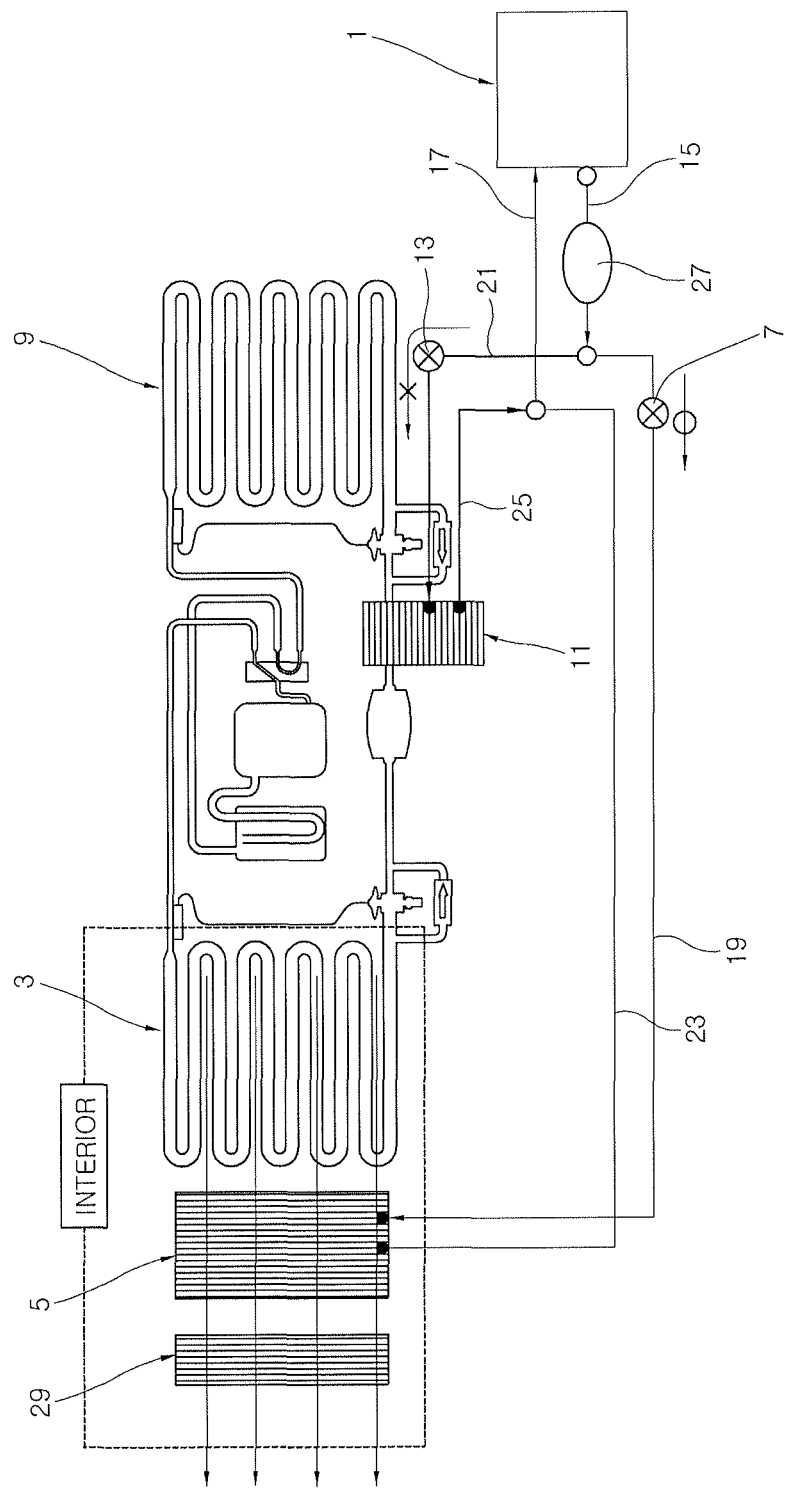

The operation of the present invention having the above configuration is described hereafter with reference to FIGS. 3 to 5.

FIG. 3 illustrates when an interior is heated by heater core 5, in which as the cooling water heated through electric device 1 is pumped by cooling water pump 27, the cooling water is supplied to heater core 5 through open first valve 7 and heats the air passing through heater core 5, such that the interior can be heated.

In this process, the heat pump or PTC heater 29 may be operated if more heating is needed, and only heater core 5 may be operated when the heating is sufficient with only heater core 5, such that it is possible to reduce unnecessary energy consumption for operating the heat pump or PTC heater 29.

FIG. 4 illustrates a defrost mode for removing frost on exterior heat exchanger 9 of the heat pump. In the present invention, the heat pump is not operated in a defrost mode to remove frost, but cooling water pump 27 supplies waste heat from electric device 1 to heat pump warmer 11 through second valve 13, with the heat pump operating in the interior heating mode, in order for heat pump warmer 11 to increase the temperature of the coolant flowing into exterior heat exchanger 9, thereby removing the frost.

Therefore, the frost is removed by heat pump warmer 11 and exterior heat exchanger 9 smoothly operates, even with the heat pump keeping operation in the interior heating mode, such that it is possible to ensure more stable and smooth heating of the interior.

Although FIGS. 3 and 4 show when the cooling water from electric device 1 is supplied to only one of heater core 5 or heat pump warmer 11, it may be possible to remove the frost simultaneously with heating the interior by supplying the cooling water to both heater core 5 and heat pump warmer 11, when sufficient waste heat is generated from electric device 1.

FIG. 5 illustrates a dehumidifying function, which removes moisture in the air by switching interior heat exchanger 3 of the heat pump to an evaporator, unlike heating, and sending the air.

In this process, the air that has passed through interior heat exchanger 3 is heated to the level of the desired interior temperature while passing through heater core 5, such that it is possible to remove the moisture from the interior environment.

In this embodiment, first valve 7 is opened with the operation of cooling water pump 27.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A temperature control apparatus for a vehicle, comprising:
   an electric device that is cooled by a cooling fluid;
   a heater core that is disposed adjacent to the interior heat exchanger of a heat pump to receive the cooling fluid that has cooled the electric device;
   a first valve that controls supply of the cooling fluid from the electric device to the heater core;
   a heat pump warmer that allows the cooling fluid from the electric device to circulate and exchange heat, is disposed in a coolant pipe for supplying a coolant to the exterior heat exchanger of the heat pump;
   a second valve that controls supply of the cooling fluid from the electric device to the heat pump warmer; and
   a cooling fluid pump that pumps the cooling fluid from the electric device to be supplied to the heater core and the heat pump warmer,
   wherein a common supply line for discharging the cooling fluid and a common collecting line for collecting the cooling fluid are connected to the electric device,
   the common supply line is divided into a first supply line connected to the heater core and a second supply line connected to the heat pump warmer,
   the common collecting line is divided into a first collecting line connected to the heater core and a second collecting line connected to the heat pump warmer,
   the cooling fluid pump is disposed in the common supply line,
   the first valve is disposed in the first supply line, and
   the second valve is disposed in the second supply line.

2. The temperature control apparatus for a vehicle as defined in claim 1, wherein the heater core is disposed in a channel through which air is sent to the interior while exchanging heat with the interior heat exchanger of the heat pump.

3. The temperature control apparatus for a vehicle as defined in claim 2, further comprising a positive temperature coefficient (PTC) heater in the channel through which air is sent to the interior while exchanging heat with the interior heat exchanger of the heat pump.

4. The temperature control apparatus for a vehicle as defined in claim 1, wherein the cooling fluid is water.

5. The temperature control apparatus for a vehicle as defined in claim 1, wherein the electric device is selected from the group consisting of: a motor, an inverter, and a converter.

6. The temperature control apparatus for a vehicle as defined in claim 5, wherein the vehicle in which the apparatus is to be mounted is a hybrid vehicle.

* * * * *